C. D. WILLIAMS.
CONVERTIBLE VEHICLE BODY.
APPLICATION FILED JAN. 11, 1916.
1,377,164.
Patented May 3, 1921.
2 SHEETS—SHEET 1.
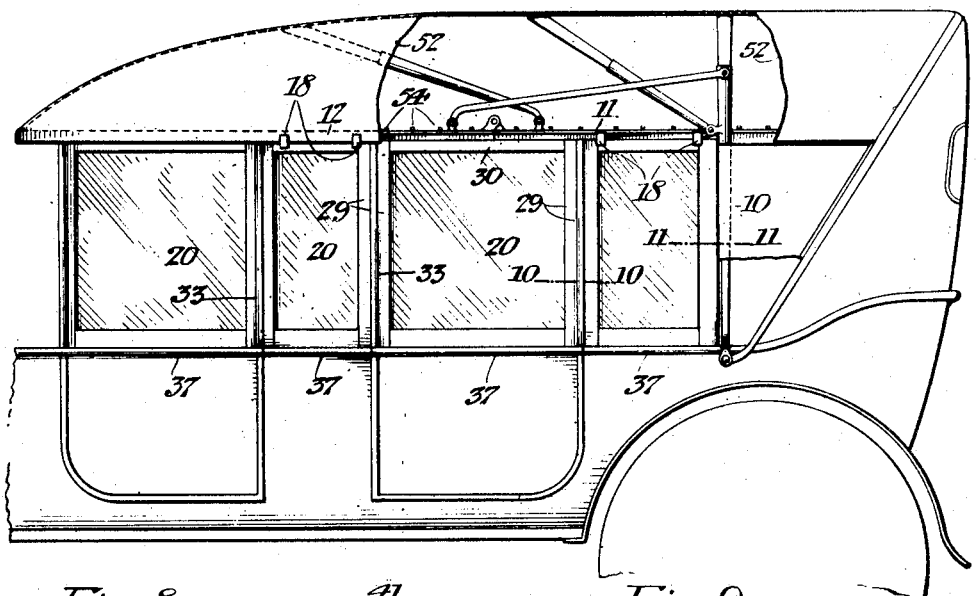
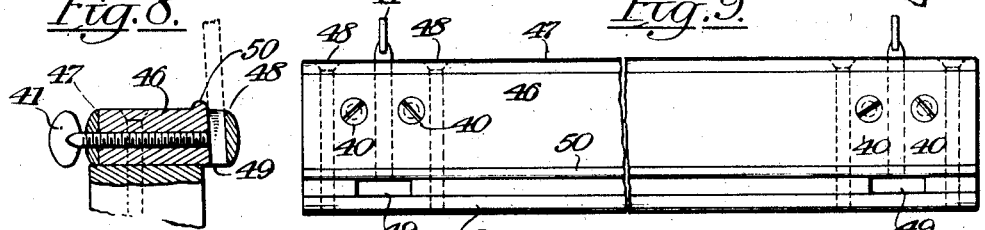
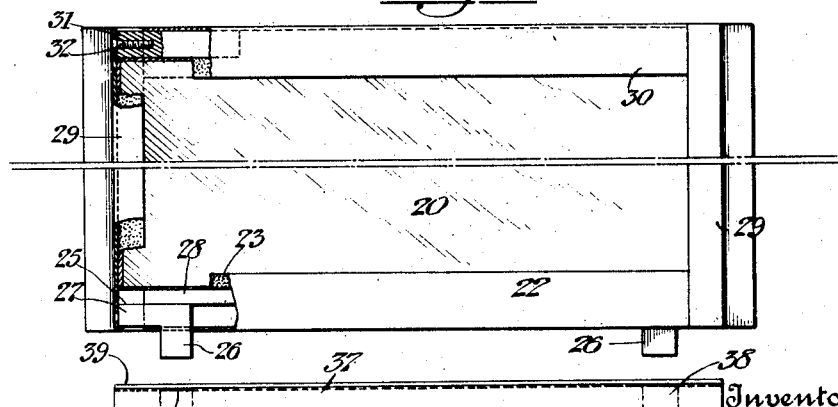
Witness:
Titus H Ims
Inventor
Charles David Williams
By his Attorney.
C. W. Fairbanks

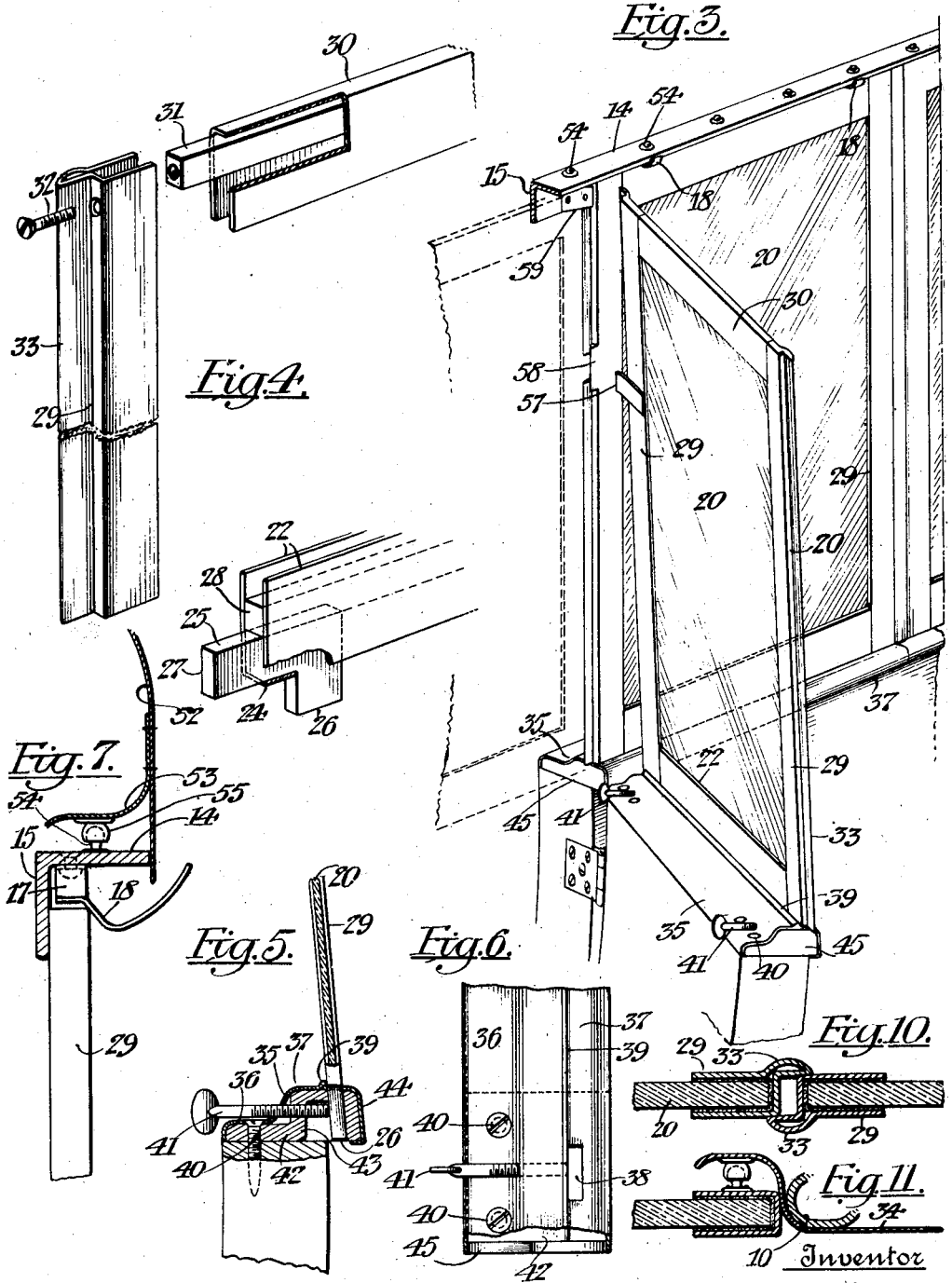

UNITED STATES PATENT OFFICE.

CHARLES DAVID WILLIAMS, OF NEW YORK, N. Y., ASSIGNOR TO ADAMS-WILLIAMS MANUFACTURING CORPORATION, A CORPORATION OF NEW YORK.

CONVERTIBLE VEHICLE-BODY.

1,377,164.  Specification of Letters Patent.  Patented May 3, 1921.

Application filed January 11, 1916. Serial No. 71,516.

*To all whom it may concern:*

Be it known that I, CHARLES D. WILLIAMS, a citizen of the United States, and a resident of New York city, borough of Manhattan, county and State of New York, have invented certain new and useful Improvements in Convertible Vehicle-Bodies, of which the following is a specification.

This invention relates to certain improvements in convertible automobile bodies and more particularly to certain improvements especially adapted for use in the type of construction illustrated in my prior Patents No. 1,151,314 and No. 1,151,315, issued August 24th, 1915.

My present invention involves an improved construction of transparent panel and certain improvements in the means for detachably securing it to the upper edge of the door or wall sections of the vehicle body and to the edge of the vehicle top so as to close the space between the body and the top and permit the user to readily convert his car into either an open or a closed body construction as desired.

The main objects which I seek to secure by my present construction are to increase the rigidity and strength of the panel, to decrease its thickness and weight, reduce the cost of manufacture, secure a more rigid connection with the supporting part, prevent rattling and facilitate the securing of my improved panels to vehicle bodies already in use.

Other important objects and the novel features of the preferred embodiment of my invention will be pointed out more particularly hereinafter.

In the accompanying drawings, to which reference is to be had and in which I have illustrated certain forms which my invention may assume,—

Figure 1 is a side elevation of a vehicle body provided with my improved construction;

Fig. 2 is a face view of one panel and upper edge of the supporting part, portions being broken away;

Fig. 3 is a perspective view showing the door in open position;

Fig. 4 is a perspective view of the detached parts showing the panel frame;

Fig. 5 is a vertical section through the lower portion of a panel and the supporting molding;

Fig. 6 is a top plan view of the molding;

Fig. 7 is a sectional view of a portion of the top and the panel retainer;

Fig. 8 is a section similar to Fig. 5 but showing a different form of molding;

Fig. 9 is a top plan view of the molding shown in Fig. 8; and

Figs. 10 and 11 are transverse sections on the line 10—10 and 11—11 respectively of Fig. 1.

My improved panel is adapted for use in a vehicle body for effectively closing the space between the upper edges of the side walls and the side edges of the top. The top itself may be either a rigid construction permanently secured to the body so as to remain at all times in a predetermined position, or it may be foldable, collapsible, or removable top of any type of construction. Preferably, it is of a type commonly known as a one-man top in which the only frame connections to the body are adjacent the rear seat and in which the front portion may be held in position adjacent the upper edge of the windshield by suitable straps, clamps or other fastening means.

The top is illustrated as including a frame member or bow 10 pivotally secured to the body adjacent the ends of the rear seat and extending in a substantially vertical plane when in a raised position. To this bow is pivotally secured a second bow normally disposed in a substantially horizontal plane when in raised position and including two sections 11 and 12 hinged together and adapted to lie in alinement with each other. These may be supported in a horizontal position in respect to the bow 10 by any suitable arrangement of bows heretofore employed in one-man tops, but which form no portion of my invention. I may, for instance, employ the arrangement and construction illustrated in my Patent No. 1,151,315 above referred to.

The front bow section 12 at its front end may be so constructed as to permit of a variation in the effective width of the front of the top so that when the top is in raised position, the front of the top may be of substantially the same width as the front of the body; while in folded position, it may be of substantially the same width as the rear of the body. This is important where the top is used in connection with a vehicle body of the common form where the front of the body is narrower than the rear and the side walls of the body converge toward the front. This adjustment in the width of the front bow may be secured by the use of the links, such for instance as shown in my prior Patent No. 1,151,314, or by making the front of the bow section 12 of telescoping or slidably connected parts. The front need not be of extensible width as a rigid construction properly designed is equally adapted for use with my present invention.

The bow sections 11 and 12 are preferably constructed so as to present a depending flange, lip, or projection, against which the panels may abut. The bow section may be of a body of wood and a sheet metal casing bent to provide a continuous depending flange substantially tangential to the inner surface of the body of the bow so that the upper edges of the side panels may lie against this flange and beneath the body of the bow. In Figs. 3 and 4, I have shown the bow section as formed of an angle iron with a horizontal flange 14 and a vertical flange 15 depending from the inner edge thereof. The upper edges of the panels are retained in engagement with this flange 15 by suitable clips so as to prevent rattling, but at the same time facilitate the rapid placing or removal of the panels. These clips are preferably of the construction shown in Fig. 7 and include a piece of spring sheet metal 17 having one end rigidly secured to the flange 14 and the opposite end bent to form a retaining catch portion 18 which may snap over the upper edge of the panel when the latter is pressed laterally beneath the body of the bow and against the flange 15.

Each panel, in its preferred construction, includes a body portion 20 in the form of a sheet of glass and a frame constructed substantially as shown in Fig. 4. The bottom member of the frame includes a substantially channel shaped piece of sheet metal, the side walls 22 thereof being spaced apart a distance but slightly greater than the thickness of the glass so as to permit of the insertion of a thin packing 23 of felt, rubber or other suitable material. At the ends of this channel strip, the web or bottom wall 24 is provided with apertures therethrough and substantially L-shaped metal corner pieces 25 are inserted, each with one arm extending down through the aperture to form an attaching lug 26 for the panel and with the other arm extending out beyond the end of the channel strip to provide a connecting lug 27 for the side member of the frame. These corner pieces may be rigidly secured to the bottom channel in any suitable manner but preferably by spot welding. Their upper edges come some little distance below the upper edges of the side walls 22 of the channel member and serve to support a narrow strip 28 extending lengthwise of the channel and upon which the glass rests.

The side members 29 of the frame are also in the form of sheet metal channels and receive between the side walls thereof the edge of the glass and a suitable packing. The lower end of each side member receives the lug 27 of the corner fastening and said lug is secured in position in any suitable manner as for instance by spot welding. The top member of the frame may be a sheet metal channel strip 30 and preferably has secured therein at its ends a corner fastening member 31 in the form of a bar which may extend into the channel of the side member of the frame. It may there be detachably secured in place so as to permit the insertion or removal of the glass. A suitable fastening means may be a screw 32 extending through the web of the side frame member and into the end of the corner fastening member 31. Suitable packing strips may be employed along the top and side edges of the glass, the same as along the lower edge.

Both the vertical strips of the panels may in some constructions be simple channel strips, yet I preferably provide a special form of channel strip which has formed as a part thereof a flange or extension serving as a weather strip. As shown, particularly in Figs. 4 and 10, one side wall of the channel is extended beyond the web and then bent back on itself to the edge of the web so as to form an integral flange of double thickness. The outer thickness may be curved if desired. The panels designed for use on the doors have these flanges arranged substantially in the plane of the outer surface, while the panels designed for attachment to the body walls have the flanges substantially in the plane of the inner surface. Thus, the webs of the channels of the two adjacent panels may be spaced a slight distance apart and extreme accuracy of fit avoided and each flange will overlap the surface of the other panel so as to prevent wind, rain, or dust from readily passing through between the panels to the interior of the vehicle body.

The rear edge of the rear panel need not have a flange of this character, but may lie closely adjacent to the vertical bow of the top as shown particularly in Figs. 1 and 11. A sheet of fabric 34 may extend across the outer surface of the bow 10, thence through between the bow and the edge of the rear panel, and then forwardly, so as to slightly overlap the inner surface of the panel. It may here be secured to the panel by a series of snap fasteners or any other suitable securing devices as shown in Fig. 11.

The members of the frame are thus rigid in construction and rigidly connected, and are of but slightly greater thickness than the glass. The joints between adjacent panels are closed. The connecting members at the lower corners are integral with the depending lugs which serve to retain the panel in position as hereinafter described. The panels so constructed are inexpensive, rigid and occupy the minimum space when removed and stored either in the rear of the front seat or in any other suitable position on the car.

As an important feature of my invention, I provide a molding strip so designed that it may be readily applied to the ordinary type of motor vehicle body and serve as a support for my improved panels. This molding may be secured directly to the upper edge of the side walls of the body and to the upper edges of the doors and may be manufactured in any lengths which may be cut up in accordance with the dimensions of the particular car to which it is to be applied. The molding, as illustrated in Figs. 2, 3, 5 and 6, includes a sheet metal strip 35 rolled, drawn, or otherwise bent to provide a comparatively low or shallow portion 36 and a higher or raised portion 37. The height of the latter is at least equal to the height of the exposed portions of the lugs 26 and has two spaced apertures 38 therethrough adapted to receive said lugs. Along the top of the raised portion 37 is a bead or flange 39 extending along one side of each of the apertures 38 so as to act as a weather strip substantially flush with the inner surface of the lower edge of the panel frame.

The lower portion 36 of the molding may be secured directly to the top of the door or side wall of the car by screws 40 or other suitable securing means. Clamping devices, preferably in the form of screws 41, extend substantially horizontally above the lower portion 36 of the mold and into the side of the raised portion so as to abut against the lugs 26 of the panel and lock or bind the latter in position. These screws may have knurled or butterfly heads to facilitate their easy and rapid tightening or loosening by hand and without the need of special tools.

As an important feature of the molding I incorporate or inclose within a sheet metal strip 35, a pair of reinforcing members to support the locking screws 41 and to form a rigid abutment against which the depending lugs 26 of the panel may be pressed. These include rigid metal plates 42 bent to present a substantially flat base portion for engagement with the upper edge of the door or side wall and beneath the lower portion 36 of the molding strip and a raised portion extending up into the raised portion 37 of the molding strip. This raised portion presents two opposite, rigid walls 43 and 44, the former acting as a support for the screw and the latter acting as an abutment against which the lug 26 is pressed. These reinforcements need not, and preferably do not, extend the full length of the molding strip, but are only placed adjacent the ends of the strip. Each has an aperture registering with the aperture 38 and each may be rigidly and permanently secured to the strip by spot welding or in any other suitable manner. In securing the molding strip to the door or wall, the screws 40 need not extend through any portion of the strip except at two points, adjacent to and on opposite sides of the locking screws 41 as is shown particularly in Fig. 3. The reinforcing strips may have an end wall integral therewith and conforming to the shape of the molding strip so as to neatly close the ends of the latter. Preferably, I employ end walls 45 either spaced from or abutting against the reinforcing plates and secured in position in any suitable manner, such, for instance, by spot welding.

It is not at all essential that the molding strip be of a width equal to the thickness of the adjacent portion of the door or side wall to which it is secured. In fact the strips may be made of uniform and standard width and may be permitted to project beyond the surface of the wall or door. This does not detract from the rigidity of the construction as the base portions lie flat on the supporting part.

In applying my improved construction to a complete automobile body, I may, in some instances, apply my molding strip directly to the upper surface of the top edge of the walls and doors, but preferably I remove the usual molding and replace it by my improved construction.

I do not wish to be limited to the specific construction of molding strip hereinabove described, as various modifications may be readily designed. In Figs. 8 and 9, I have shown a molding construction in which there is a strip of wood 46 constituting the body portion of the molding and having metal facing strips 47 and 48 upon opposite vertical sides. The wooden body portion and the facing strips may all be secured together by transversely extending bolts or screws. The recesses for the lugs of the panel may be formed by cutting notches or apertures 49 in the face of the wooden strip adjacent to the facing strip 48 and the locking screws 41 may extend through the other facing strip 47 and the wooden strip 46 so as to force the panel lugs against the facing strip 48. This molding may be secured in place by screws 40 the same as are used with the molding strip first described. The upper surface of the wooden strip 46 may have a bead 50 constituting a weather strip and corresponding to the bead 39.

The constructions of molding shown in Figs. 5, 6, 8 and 9 are particularly designed for use where an ordinary vehicle body without side panels is to be equipped with my invention. Such molding may be applied upon the molding already in place, or as a substitute for the latter upon the removal of such old molding. Where the invention is to be incorporated in the vehicle body at the time the latter is designed and built, the sockets or recesses which receive the depending lugs 26 of the panels may extend down into the wall rather than merely into the molding. The molding might be a plain flat strip, either secured to or extending over metal sockets set into the wall and the fastening screws 41 might extend through the wall itself, rather than through the molding so as to engage with and lock the lugs 26 and hold the panel in position.

The fabric constituting the top may be secured to the posts or other construction forming the frame of the top in any suitable manner, but preferably I employ the construction shown particularly in Fig. 7. The fabric 52 extends down to a point slightly below the angle irons of the top frame and to the inner surface of the fabric is secured a narrow flap 53 adapted to extend approximately horizontally and lie above the upper and horizontal flange 14 of the frame of the top. This flap may be secured to said flange by spaced pairs of coacting snap fasteners 54 and 55 which may be similar in construction to ordinary glove fasteners or may be similar to any one of various forms of curtain fasteners used in connection with automobile tops.

By the use of these snap fasteners, it is not essential that the fabric of the top be unfastened from the bow sections 11 and 12 before the latter is collapsed and folded back. Upon folding the top, the hinge between the sections 11 and 12 will swing downwardly and if the fabric has not been unfastened from them, the snap fasteners will automatically disengage during the folding and thus liability of tearing the fabric is avoided.

The openings or sockets in the molding and which receive the lugs 26 are preferably set at a slight angle to that when the panels are placed in position and locked by the screws 41, they tilt inwardly and are caused to resiliently press against the vertical flange 15 of the vehicle top. This prevents any vibration which might tend to cause rattling of the parts as the vehicle passes over a rough road. For additionally holding the door panels in alinement with the wall panels, each door panel on its inner surface and adjacent to the edge above the hinged edge of the door may have a projecting spring tongue 57 which will engage with the inner surface of the wall panel when the door is closed and the wall panel may have a flange 58 which will engage with the outer surface of the door panel. These may extend through the recesses in the flanges 33. It is evident that the flanges 33 will prevent any relative movement of the panels in one direction while the tongue 57 and flange 58 will prevent any relative movement in the opposite direction. The vertical flange 15 of the top may have a small wedge piece 59 which will engage with the inner surface of the door panel at its upper inner corner and force the latter outwardly into engagement with the flange 58 as the door is closed.

Having thus described my invention, what I claim as new and desire to secure by Letters Patent is:

1. In combination, a vehicle body having a door, a top spaced from the upper edge thereof, a molding strip secured to the upper edge of said door and having recesses spaced apart along the length thereof, a panel including a frame, a transparent section and lugs depending from the lower edge of said frame and adapted to enter said recesses, and means carried by said molding strip for clamping said lugs within said recesses and holding said panel substantially rigid in respect to said door, and tilted inwardly so as to resiliently engage with said top.

2. In combination, a vehicle body, a top carried thereby, a removable panel intermediate of said top and said body, a molding carried by said body and having spaced apertures in the upper surface thereof, lugs depending from said panel and adapted to enter said apertures upon a vertical movement of said panel, and means for locking said lugs within said aperture and tilting the upper end of the panel beneath a portion of said top to normally prevent the vertical movement of said panel.

3. A panel for use between the upper edge of a vehicle body and the lower edge of the top and including a sheet of glass, a plurality of channel shaped strips each receiving one edge of the glass, and a plurality of lugs at the lower corners of the glass and each having a portion extending downwardly below the lower channel strip and a portion connecting the side and lower channel strips.

4. A panel for use in closing the space between the upper edge of a vehicle body and the lower edge of the top, including a sheet of glass and a frame formed of a plurality of channel shaped strips, connecting lugs disposed within the lower strip extending endwise into the side strips and having portions projecting downwardly through the web of the bottom strip, bars within the upper strip and projecting endwise into the side strips, and means for detachably connecting said bars and said side strips.

5. A panel for use in closing the space between the upper edge of a vehicle body and the lower edge of the top, including a sheet of glass and a frame formed of a plurality of channel shaped strips, connecting lugs disposed within the lower strip extending endwise into the side strips and having portions projecting downwardly through the web of the bottom strip, bars within the upper strip and projecting endwise into the side strips, and means for detachably connecting said bars and said side strips, each of said side strips having a flange projecting outwardly substantially in the plane of one side wall of the channel constituting the strip.

6. In combination, a vehicle body, a top carried thereby including a substantially vertical bow and a substantially horizontal bow secured to the first mentioned bow, and extending above the upper edge of said body, a wall panel detachably secured to the upper edge of said body and having its upper edge engaging with said second mentioned bow, and a curtain extending rearwardly from said first mentioned bow and having its edge extending through between said first mentioned bow and said panel and detachably secured to said panel adjacent the rear edge thereof.

7. In combination, a vehicle body, a top carried thereby presenting a substantially horizontal flange and a depending flange, a plurality of door and wall extensions detachably carried by said body and having their upper edges disposed beneath and spaced from said horizontal flange, and a plurality of leaf springs extending lengthwise of said top adjacent to said vertical flange and extending lengthwise of said horizontal flange, each of said leaf springs having a laterally extending projection with which the upper edge of the door extension may engage and beneath which it may pass during the closing of the door.

8. In combination, a vehicle body, a top carried thereby, and having a side bow presenting a horizontal flange and a depending flange, a door having a plurality of recesses or sockets in the upper edge thereof, a panel having depending lugs at its lower edge adapted to enter said recesses whereby the panel may be rigidly secured to and carried by said door, and a resilient retainer including a leaf spring portion secured and extending lengthwise of said horizontal flange and a laterally extending projection adapted to engage with the upper edge of the door and beneath which the latter may pass in closing the door.

9. In combination, a vehicle body, a top carried thereby, and presenting a horizontal flange and a depending flange, a plurality of resilient retainers, each extending lengthwise of and secured to the under side of said horizontal flange and a panel having depending projections at its lower edge for attachment to said body and having its upper edge adapted to move laterally beneath the said horizontal flange, and be held down and retained by one or more of said retainers.

10. In combination with a vehicle body, a top carried thereby and presenting a horizontal flange and a depending flange, a plurality of resilient retainers each extending lengthwise of and secured to the under side of said horizontal flange, a panel and projections for engaging the lower edge of the panel to the upper edge of the body and adapted to prevent sliding or lateral movement of the panel, said panel having its upper edge adapted to move laterally beneath said horizontal flange and be held down and retained by one or more of said retainers.

11. A vehicle having a plurality of removable panels in substantially the same plane, each including a sheet of glass and a frame, said frame including a plurality of channel shaped strips each receiving one edge of the glass, a plurality of connecting members at the upper corners, each extending into the channel shaped strips of the adjacent edges of the panel, members within the lower channel of the frame and clamping devices carried by the upper edge of the wall of the vehicle body for coöperating with said members to detachably secure the panel in position.

12. A vehicle having a plurality of removable panels in substantially the same plane, each including a sheet of glass and a frame, said frame including top and bottom members and vertical side members, the latter each formed of a sheet metal strip having its opposite edge portions disposed substantially parallel and spaced apart to form a channel to receive the edge of the glass, and the intermediate portions of the strip including a web for the channel, and a flange of double thickness at one edge of the web and substantially parallel to said edge portions, and with its inner surface in substantially the same plane as the outer surface of one of said side portions, the said flanges on the adjacent edges of said panels, lying on opposite sides of the plane of the glass, and the flange of each panel overlapping the frame of the adjacent panel.

13. A vehicle having a plurality of removable panels in substantially the same plane, each including a sheet of glass and a frame, said frame including a plurality of channel shaped strips, each receiving one edge of the glass, and a plurality of connecting members at the corners of the panel, each extending into the channel shaped strips of adjacent edges of the panel, and clamping devices carried by the upper edge of the wall of the vehicle body for detachably engaging with the connecting members at the lower corners of the panel.

Signed at New York city in the county of New York and State of New York this 31st day of December A. D. 1915.

CHARLES DAVID WILLIAMS.

Witness:
FLORENCE LEVIEN.